(12) United States Patent
Billow et al.

(10) Patent No.: US 8,060,840 B2
(45) Date of Patent: Nov. 15, 2011

(54) ORIENTATION FREE USER INTERFACE

(75) Inventors: Charles R Billow, North Bend, WA (US); Gretchen Richter de Medeiros, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 11/321,551

(22) Filed: Dec. 29, 2005

(65) Prior Publication Data
US 2007/0157095 A1    Jul. 5, 2007

(51) Int. Cl.
*G06F 3/048* (2006.01)

(52) U.S. Cl. ........ 715/825; 715/810; 715/827; 715/830; 715/834; 715/750

(58) Field of Classification Search .......... 715/825, 715/810, 827, 830, 834, 702, 750
See application file for complete search history.

(56) References Cited

U.S. PATENT DOCUMENTS

| | | | |
|---|---|---|---|
| 4,992,650 A | 2/1991 | Somerville | |
| 5,109,537 A | 4/1992 | Toki | |
| 5,319,214 A | 6/1994 | Gregory | |
| 5,436,639 A | 7/1995 | Arai | |
| 5,483,261 A | 1/1996 | Yasutake | |
| 5,526,177 A | 6/1996 | Fantone | |
| 5,528,263 A | 6/1996 | Platzker | |
| 5,821,930 A * | 10/1998 | Hansen | 715/702 |
| 5,831,601 A | 11/1998 | Vogeley | |
| 5,835,692 A | 11/1998 | Cragun et al. | |
| 5,900,863 A | 5/1999 | Numazaki | |
| 5,920,688 A | 7/1999 | Cooper et al. | |
| 5,940,076 A * | 8/1999 | Sommers et al. | 715/834 |
| 5,973,315 A | 10/1999 | Saldana | |
| 5,973,689 A * | 10/1999 | Gallery | 715/859 |
| 6,088,019 A | 7/2000 | Rosenberg | |

(Continued)

FOREIGN PATENT DOCUMENTS

EP    0690407    5/2004

(Continued)

OTHER PUBLICATIONS

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

(Continued)

*Primary Examiner* — Steven Sax
*Assistant Examiner* — Anil N Kumar
(74) *Attorney, Agent, or Firm* — Workman Nydegger

(57) ABSTRACT

Generation and display of a dynamically orientable graphical user interface (GUI) is described. The GUI can include user input controls that are configured to receive user input. In one exemplary embodiment, the GUI is displayed as a band around a perimeter of a horizontally oriented interactive display surface. The user input controls can be made to reorient in response to an application that provides control, or a user can selectively cause the GUI to move relative to the interactive display surface to enable the user to gain access to a specific that was previously disposed at a different point. The user input can be received directly from the orientable GUI in the form of finger movement detected by the interactive display surface and the reorientation of the GUI can be controlled according to the laws of physics, based on the user input.

15 Claims, 7 Drawing Sheets

U.S. PATENT DOCUMENTS

| | | | |
|---|---|---|---|
| 6,111,565 A | 8/2000 | Chery | |
| 6,128,003 A | 10/2000 | Smith | |
| 6,154,214 A | 11/2000 | Uyehara et al. | |
| 6,181,343 B1 | 1/2001 | Lyons | |
| 6,266,061 B1 | 7/2001 | Doi | |
| 6,269,172 B1 | 7/2001 | Rehg | |
| 6,340,119 B2 | 1/2002 | He | |
| 6,414,672 B2 | 7/2002 | Rekimoto | |
| 6,448,987 B1* | 9/2002 | Easty et al. | 715/834 |
| 6,469,722 B1 | 10/2002 | Kinoe et al. | |
| 6,476,378 B2 | 11/2002 | Nougaret | |
| 6,478,432 B1 | 11/2002 | Dyner | |
| 6,520,648 B2 | 2/2003 | Stark | |
| 6,522,395 B1 | 2/2003 | Barnji | |
| 6,529,183 B1 | 3/2003 | MacLean | |
| 6,545,663 B1 | 4/2003 | Arbter | |
| 6,600,475 B2 | 7/2003 | Gutta | |
| 6,614,422 B1 | 9/2003 | Rafii | |
| 6,654,007 B2 | 11/2003 | Ito | |
| 6,663,244 B1 | 12/2003 | Wichner | |
| 6,690,363 B2 | 2/2004 | Newton | |
| 6,710,770 B2 | 3/2004 | Tomasi | |
| 6,714,221 B1* | 3/2004 | Christie et al. | 715/784 |
| 6,720,949 B1 | 4/2004 | Pryor | |
| 6,750,877 B2* | 6/2004 | Rosenberg et al. | 715/701 |
| 6,781,069 B2 | 8/2004 | Silverstein | |
| 6,788,813 B2 | 9/2004 | Cooper | |
| 6,791,530 B2* | 9/2004 | Vernier et al. | 345/156 |
| 6,804,396 B2 | 10/2004 | Higaki | |
| 6,812,907 B1 | 11/2004 | Gennetten | |
| 6,840,627 B2 | 1/2005 | Olbrich | |
| 6,888,960 B2 | 5/2005 | Penev | |
| 6,895,104 B2 | 5/2005 | Wendt | |
| 6,959,102 B2 | 10/2005 | Peck | |
| 7,007,236 B2 | 2/2006 | Dempski | |
| 7,075,687 B2 | 7/2006 | Lippert | |
| 7,084,859 B1 | 8/2006 | Pryor | |
| 7,095,401 B2 | 8/2006 | Liu | |
| 7,120,280 B2 | 10/2006 | Biswas | |
| 7,144,117 B2 | 12/2006 | Kojima | |
| 7,161,578 B1 | 1/2007 | Schneider | |
| 7,168,813 B2 | 1/2007 | Wong | |
| 7,204,428 B2 | 4/2007 | Wilson | |
| 7,268,774 B2 | 9/2007 | Pittel | |
| 7,310,085 B2 | 12/2007 | Holloway | |
| 7,372,977 B2 | 5/2008 | Fujimura | |
| 7,397,464 B1 | 7/2008 | Robbins | |
| 7,404,146 B2* | 7/2008 | Bennetts et al. | 715/762 |
| 7,418,671 B2* | 8/2008 | Hama et al. | 715/830 |
| 7,467,380 B2 | 12/2008 | Kurlander | |
| 7,665,041 B2 | 2/2010 | Wilson | |
| 2003/0156756 A1 | 8/2003 | Gokturk | |
| 2003/0161524 A1 | 8/2003 | King | |
| 2004/0001113 A1 | 1/2004 | Zipperer | |
| 2004/0005920 A1 | 1/2004 | Soltys | |
| 2004/0046784 A1* | 3/2004 | Shen et al. | 345/733 |
| 2004/0090524 A1 | 5/2004 | Belliveau | |
| 2004/0155902 A1 | 8/2004 | Dempski | |
| 2004/0196371 A1 | 10/2004 | Kono | |
| 2005/0006786 A1 | 1/2005 | Sawada | |
| 2005/0050476 A1* | 3/2005 | SanGiovanni | 715/834 |
| 2005/0122306 A1 | 6/2005 | Wilcox | |
| 2005/0122308 A1 | 6/2005 | Bell | |
| 2005/0151850 A1 | 7/2005 | Ahn | |
| 2005/0212753 A1 | 9/2005 | Marvit | |
| 2005/0226467 A1 | 10/2005 | Hatano | |
| 2005/0226505 A1 | 10/2005 | Wilson | |
| 2005/0227217 A1 | 10/2005 | Wilson | |
| 2005/0238201 A1 | 10/2005 | Shamaie | |
| 2005/0245302 A1 | 11/2005 | Bathiche | |
| 2005/0255434 A1 | 11/2005 | Lok | |
| 2005/0277071 A1 | 12/2005 | Yee | |
| 2006/0010400 A1 | 1/2006 | Dehlin | |
| 2006/0034492 A1 | 2/2006 | Siegel | |
| 2006/0036944 A1 | 2/2006 | Wilson | |
| 2006/0056662 A1 | 3/2006 | Thieme | |
| 2006/0092170 A1 | 5/2006 | Bathiche | |
| 2006/0092267 A1 | 5/2006 | Dempski | |
| 2006/0178212 A1* | 8/2006 | Penzias | 463/37 |
| 2006/0244719 A1 | 11/2006 | Brigham | |
| 2007/0046625 A1 | 3/2007 | Yee | |
| 2007/0063981 A1 | 3/2007 | Galyean | |
| 2007/0075163 A1 | 4/2007 | Wilson | |
| 2007/0126717 A1 | 6/2007 | Cohen | |
| 2007/0279494 A1 | 12/2007 | Aman | |
| 2008/0036732 A1* | 2/2008 | Wilson et al. | 345/156 |
| 2008/0122786 A1 | 5/2008 | Pryor | |
| 2009/0121894 A1 | 5/2009 | Wilson | |
| 2009/0262070 A1 | 10/2009 | Wilson | |

FOREIGN PATENT DOCUMENTS

| | | |
|---|---|---|
| FR | 27656077 | 8/2003 |
| JP | 2004319364 | 11/2004 |
| JP | 2006031941 | 2/2006 |
| JP | 2007514242 | 5/2007 |
| WO | 9714075 | 4/1997 |
| WO | 98/19292 | 5/1998 |
| WO | 2005057399 | 6/2005 |

OTHER PUBLICATIONS

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Notice of Allowance dated Oct. 8, 2008 cited in U.S. Appl. No. 10/880,167.

Notice of Allowance Dated Oct. 17, 2008 cited in U.S. Appl. No. 10/969,746.

Office Action dated Oct. 7, 2008 cited in U.S. Appl. No. 11/218,171.

Office Action dated Oct. 30, 2008 cited in U.S. Appl. No. 12/106,910.

Office Action dated Sep. 2, 2008 cited in U.S. Appl. No. 11/170,234.

Notice of Allowance dated Sep. 11, 2008 cited in U.S. Appl. No. 11/117,979.

U.S. Appl. No. 12/110,032, filed May 4, 2006, Bathiche.

"3.6 Interpolation in Two or More Dimensions," Numerical Recipes in C: The Art of Scientific Computing. Chapter 3. Interpolation and Extrapolation. © 1988-1992, Cambridge University Press. Numberical Recipes Software. pp. 123-128.

"Bar Code 1,2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://wwww.darmstadt.gmd.de/ambiente/activities/interactable.html. Printed Nov. 21, 2003 3pp.

Bier, Stone, Pier, Buston, and DeRose. "Toolglass and Magic Lenses: The See-Through Interface." Proceedings of Siggraph '93 (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 47-47.

"DiamondSpin—Begs for Direct Manipulation Technology Is it in the Pen? Sony Leaps Out-of-the-Box Again Pen with Gummi." Mitsubishi/DiamondSpin. CHI2004#3. Printed Apr. 30, 2004. 5pp.

Dietz and Leigh, "DiamondTouch: A Multi=User Touch Technology." UIST '01 Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).

Fukuchi and Rekimoto. Interaction Tehcniques for SmartSkin.: ACM UIST2002 demonstration, 2002. 2pp.

Grabowski, Robert. "A Miniature Vidwo Laser Range Finder for Small Robots." Available http://www.andrew.cmu.edu/~rig/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directios. New Orleans, LA. Nov. 2002. pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp. Total.

Horn, Berthold Klaus Paul. "Robot Vision." Binary Images: Topological Properties. The MIT Electrical Engineering and Computer Sciene Seriese. 1986. pp. 66-71 an cover page(s).

Hunter, Anderw. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

IR Distance Sensor.: Available http://www.diyelectronics.com/Accessories/IRDS.html (2pp) and http://www.diyelectronics.com/Accessories/GP2D05.html (1pg.). Printed Dec. 30, 2003. 3pp.

"Tangible Bits: Towards Seamless Interfaces between People, Bits and Atoms." Proceedings of CHI '97, Mar. 22-27, 1997, Atlanta, Georgia © 1997 ACM 0-89791-802-9/97/03. pp. 1-8.

Ishii, Wisneski, Orbanes, Chun, and Paradiso. "PinPongPlus: Design of an Athletic-Tangible Interface for Computer-Supported Cooperative Play." Proceedings of CHI '99, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." Extended Abstracts of CHI 2001, Seattle. Apr. 2001 pp. 269-270.

Kang, Sing Bing. "Radial Distortion Snakes." IAPR Workshop on Machine Vision Applications (MVA2000), Tokyo, Japan. Nov. 2000. pp. 603-606.

Klemmer, Newman, and Sapien. "The Designer's Outpost: A Task-Centered Tangible Interface for Web Site Information Design." Proceedings of Human Factors in Computing Systems: CHI 2000 Extended Abstracts. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." CHI Letters, The 14th Annual ACM Symposium on User Interface Soft Technology: UIST 2001. 3(2). pp. 1-10.

Kobayashi, Hirano, Narita, and Ishi. "A Tangible Interface for IP Network Simulation." CHI 2003, Apr. 5-10, 2003, F. Lauderdale, FL ACM 1-58113-630-07/03/0004. 2pp.

Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction in Semi-Immersive Virtual Environments." Proceedings of the IEEE Virtual Relaity 2000 Conference, Mar. 18-22, 2000. New Brunswich, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated. 2pp. Magerkurth, Stenzel, and Prante. "STARS—A Ubiquitous Computing Platform fo rComputer Augmented Tabletop Games." 5th International Conference on Ubiquitous Computing (Ubicomp '03), Oct. 12-15, 2003, Seattle, Washington. 2 pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, Alberta, Canada. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UIST 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. of UIST 2000, 2000. 10pp.

Rekimoto and Matsushita. "Perceptual Surfaces :Towards a Human and Object Sensitive Interactive Display." Proceedings of Workshop on Perceptural User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Coninuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Reistration Method for Augmented Reality." Proc. of Asia Pacific Computer Human Interaction (APCHI '98), 1998, 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infrastructure for Freehand Manipulation on Interactive Surfaces." CHI 2002, Apr. 20-25, 2002, Minneapolis, Minnesota. © 2001 ACM 1-58113-453-3/02/0004. 8pp.

Rekimoto, Ullmer, and Oba. "Data Tiles: A Modular Platform for Mixed Physical and Graphical Interactions." SIGCHI'01, Mar. 31-Apr. 4, 2001, Seattle, WA. © 2001 ACM 1-58113-327-8/01/0003. 8pp.

Reznik, Canny, and Alldrin. "Leaving on a Plane Jet." 2001 Int. Conf. on Intell. Robots & Systems (IROS), Maui, Hawaii, Oct. 2001, 6pp.

Ringel, Gerh, Jin, and Winograd. "Barehands: Implement-Free Interaction with a Wall-Mounted Display." Short Talk. CHI Mar. 31-Apr. 5, 2001. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." Home>Reviews, TablePCHome.com—Table PC user community. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With the Virtual Table." Presented at 1999 ACM Symposium on Interactiave 3D Graphics (I3DG '99). Apr. 26-28, 1999, Atlanta, GA. 7pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." Interactions. Mar. -Apr. 2003. pp. 15-22.

Shen, Lesh, Bernier, Forlines, and Frost. "Sharing and Building Digital Group Histories." CSCW'02, Nov. 16-20, 2002, New Orleans, Louisiana. © 2002 ACM 1-58113-560-2/02/0011. 10pp.

Shen, Vernier, Forline, and Ringel. "DiamondSpin: An Extensible Toolkit for Around-the-Table Interaction." CHI 2004, Apr. 24-29, 2004, Vienna, Austria. © 2004 ACM 1-58113-702-08/04/0004. 8pp.

SMART Technologies Inc. White Paper. "DViT Digital Vision Touch Technology." Feb. 2003. 10pp.

Smart Technologies, Inc. "Rear Projection SMART Board TM Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary,Lyons, Gandy, and Pair. "Towards Augmented Reality Gaming." Available http://www.gvu.gatech.Edu/ccg/publications/imagina2000/. Printed Dec. 30, 2003. 27pp.

Streitz, Geiβler, Holmer, Konomi, Müller-Tomfelde, Reischl, Rexrogh, Seitz, and Steinmetz. "i-LAND: An interactive Landscape for Creativity and Innovation." Proceedings of the ACM Conference on Human Factors in Computing Systems (CHI'99), Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC a detailed look at Microsoft's proposed Tablet PC." Pen Computing Magazine: Tablet PC. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." Proceedings of the 14. Annual ACM Symposium on User Interface Software and Technoic (USIT'01), ACM Press (CHI Letters 3(2)),2001,pp. 11-20 (10pp).

Ullmer and Ishii. "The metaDESK: Models and Prototypes for Tangible User Interfaces." Proceedings of UIST'97, Oct. 14-17, 1997. © 1997 ACM—ACM 0-89791-881-9/97/10. 10pp.

Ullmer, Ishii and Glas. "mediaBlocks: Physical Containers, Transports, and Controls for Online Media." Computer Graphics Proceedings (SIGGRAPH'98), Jul. 19-24, 1998, © 1998 ACM. ACM-0-89791-999-8 8/98/007. 8pp.

Underkoffler and Ishii. "Illuminating Light: An Optical Design Tool with a Luminous-Tangible Interface." Proceeding of CHI '98, Apr. 18-23, 1998, © 1998 ACM. pp. 1-8.

Underkoffler and Ishii. "Urp: A Luminous-Tangible Workbench for Urban Planning and Design." Proceedings of CHI '99. May 15-20, 1999. © 1998 ACM. pp. 1-8.

Underkoffler Ullmer, and Ishii. "Emancipated Pixels: Real-World Graphics in the Luminous Room." Proceedings of SIGGRAPH '99, Aug. 8-13, 1999, © 1999 ACM. 8pp.

Vernier, Lesh and Shen. "Visualization Techniques for Circular Tabletop Interfaces." To appear in Advanced Visual Interfaces, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL Jan. 2001, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." Communications of the ACM. Jul. 1993. EuroPARC tech report EPC-93-195. 17pp.

Whalen, Tara. "Playing well with Others: Applying Board Game Design to Tabletop Display Interfaces." UIST 2003. Vancouver, Nov. 2-5, 2003, 3pp.

Wu and Balakrishnan. "Multi-Finger and Whole Hand Gestural Interaction Techniques for Multi-User Tabletop Displays." UIST '03, Vancouver, B.C., Canada. © 2003 ACM 1-58113-636-6/03/0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

"The Tracking Cube: A Three Dimensional Input Device" IBM Technical Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Office Action mailed Jun. 29, 2007 cited in related U.S. Appl. No. 10/834,675.

Office Action dated Aug. 30, 2007 cited in related U.S. Appl. No. 10/870,777.

Office Action dated Dec. 13, 2007 cited in related U.S. Appl. No. 10/834,675.

Office Action dated Oct. 9, 2007 cited in related U.S. Appl. No. 10/867,434.

Notice of Allowance dated Feb. 28, 2008, cited in related U.S. Appl. No. 10/870,777.

Notice of Allowance dated Mar. 28, 2008 cited in related U.S. Appl. No. 10/834,675.

Notice of Allowance mailed Feb. 27, 2008 cited in related U.S. Appl. No. 10/814,761.

Office Action dated Mar. 25, 2008 cited in related U.S. Appl. No. 10/880,167.

Notice of Allowance dated Apr. 23, 2008 cited in related U.S. Appl. No. 10/969,746.

Office Action dated Jun. 12, 2008 cited in related Application No. 11/117,979.

Office Action dated Oct. 9, 2007 cited in related U.S. Appl. No. 10/813,855.

Office Action dated May 7, 2008 cited in related U.S. Appl. No. 10/813,855.

Office Action dated Jun. 26, 2008 cited in related U.S. Appl. No. 11/364,319.

Office Action dated Jun. 26, 2008 cited in U.S. Appl. No. 11/364,319.
Office Action dated Jul. 10, 2008 cited in U.S. Appl. No. 10/867,434.
Notice of Allowance dated Oct. 16, 2007 cited in U.S. Appl. No. 10/814,761.

Office Action dated Aug. 29, 2008 cited in U.S. Appl. No. 10/870,777.

Notice of Allowance dated Dec. 31, 2008 cited in U.S. Appl. No. 10/880,167.

Notice of Allowance dated May 6, 2009 cited in U.S. Appl. No. 10/870,777.

Office Action dated Nov. 28, 2008 cited in U.S. Appl. No. 10/867,434.

Office Action dated Sep. 17, 2009 cited in U.S. Appl. No. 10/867,434.
Notice of Allowance dated Mar. 11, 2009 cited in U.S. Appl. No. 10/969,746.

Notice of Allowance dated Nov. 14, 2008 cited in U.S. Appl. No. 11/117,979.

Office Action dated Feb. 19, 2009 cited in U.S. Appl. No. 10/813,855.
Office Action dated Sep. 24, 2009 cited in U.S. Appl. No. 10/813,855.
Notice of Allowance dated Jun. 25, 2009 cited in U.S. Appl. No. 12/106,910.

Notice of Allowance dated Dec. 31, 2008 cited in U.S. Appl. No. 11/364,319.

Notice of Allowance dated Jan. 12, 2009 cited in U.S. Appl. No. 11/170,234.

Office Action dated Apr. 15, 2009 cited in U.S. Appl. No. 11/218,171.
Office Action dated Nov. 23, 2009 cited in U.S. Appl. No. 11/218,171.

Moran, Saund, van Melle, Gujar, Fishkin, and Harrison. Design and Technology for Collaborage: Collaborative Collages of Information on.

U.S. Appl. No. 12/110,032, Mail Date Jul. 8, 2010, Office Action.
U.S. Appl. No. 12/110,032, Mail Date Nov. 2, 2010, Notice of Allowance.

U.S. Appl. No. 11/218,171, Mail Date Dec. 13, 2010, Notice of Allowance.
U.S. Appl. No. 10/867,434, Mail Date Jun. 14, 2010, Notice of Allowance.
U.S. Appl. No. 11/218,171, Mail Date Jun. 17, 2010, Office Action.
U.S. Appl. No. 10/813,855, Mail Date Jun. 22, 2010, Office Action.
U.S. Appl. No. 13/032,877, filed Feb. 23, 2011, Yee.
U.S. Appl. No. 12/492,178, Mail Date Feb. 25, 2011, Office Action.
Scott, Grant, and Mandryk. "System Guidelines for Co-located Collaborative Work on a Tabletop Display." Proceedings of ECSCW'03, European Conference Computer-Supported Cooperative Work 2003, Helsinki, Finland, Sep. 14-18, 2003. 20pp.

Shen, Lesh, and Moghaddam, Beardsley, and Bardsley. "Personal Digital Historian: User Interface Design." © Mitsubishi Electric Research Laboratories, Inc. Jan. 2001. Cambridge, Massachusetts. 5pp.
Ullmer, Ishii and Jacob. "Tangible query Interfaces: Physically Constrained Tokens for Manipulating Database Queries." Proc. INTERACT 2003 Conference, Sep. 1-5, 2003. 12pp.
Department of Defense, Department of Defense Logistics Automatic Identification Technology Handbook for Product and Shipping Label Quality Assurance, Feb. 15, 2000, p. 14, Section 3.3.3.6 Quiet Zones.

* cited by examiner

ORIENTATION FREE USER INTERFACE

BACKGROUND

The utility of computer systems can be enhanced by providing better user interfaces. User interfaces for computers systems have evolved significantly since the personal computer (PC) first became widely available. Early PCs used rather primitive user input devices, such as the serial mouse, and only provided a monochrome display. However, the vast improvement in microprocessors, available memory, and programming functionality have all contributed to the advancement of user interface design and the development of user friendly graphic operating systems and hardware.

One particular area of advancement in user interface technology pertains to an interactive display system. Such systems usually include an enclosure, a display surface, various image projection and user input detection equipment, and a computer. An interactive display system can include or be coupled to a general purpose computing device. A significant advantage of the interactive display system is that it enables user interaction directly with a display surface. A user can provide input to this type of system by directly touching the interactive display surface with one or more fingers, or by making a gesture just above the interactive display surface. However, interactive display systems can suffer certain limitations and disadvantages if constrained to implement a graphical user interface (GUI) like that employed by applications designed to be executed on conventional personal computers (PCs). For example, a user of an interactive display system can interact with a horizontal display surface from any side. By its nature, a horizontal interactive display surface is not like a conventional vertical display that has a "top" and "bottom" and is intended to be viewed by a person sitting in front of the conventional display. In contrast to a conventional vertically oriented display, users who are disposed on opposite sides of an interactive display will clearly prefer a graphical user interface that is oriented relative to the user, in order to have a similar user experience. Thus, the graphical user interface that is oriented appropriate for the user on one side of the horizontal interactive display surface will appear inverted to the user on the other side of the interactive display surface, and vice versa. Therefore there is presently motivation for developing solutions to these and other limitations of the prior art that interfere with the user's enjoyment of a generally horizontal interactive display surface. It would be clearly be preferable to provide a dynamic orientation free user interface, for use with applications executed on interactive display systems.

SUMMARY

Various implementations are discussed below that enable the generation and display of a user interface having dynamically orientable user input controls. In particular, the user interface can be displayed on an interactive display through a computer implemented method so that the user interface is appropriately oriented to be viewed by users disposed at different positions around a periphery of the interactive display. Further details of an exemplary implementation are presented below. This implementation includes the step of selecting a portion of a main graphical user interface (GUI). An independent and dynamically orientable GUI is then generated within the portion that was selected. In this implementation, the dynamically orientable GUI can provide one or more user input controls, which are enabled to be oriented within the selected portion of the orientable GUI based on input provided by a user. This user input can be provided by the user interacting with the orientable GUI provided on the interactive display.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Furthermore, in the claims that follow, when a list of alternatives uses the conjunctive "and" following the phrase "at least one of" or following the phrase "one of," the intended meaning of "and" corresponds to the conjunctive "or."

Exemplary Computing System

Figure 1:
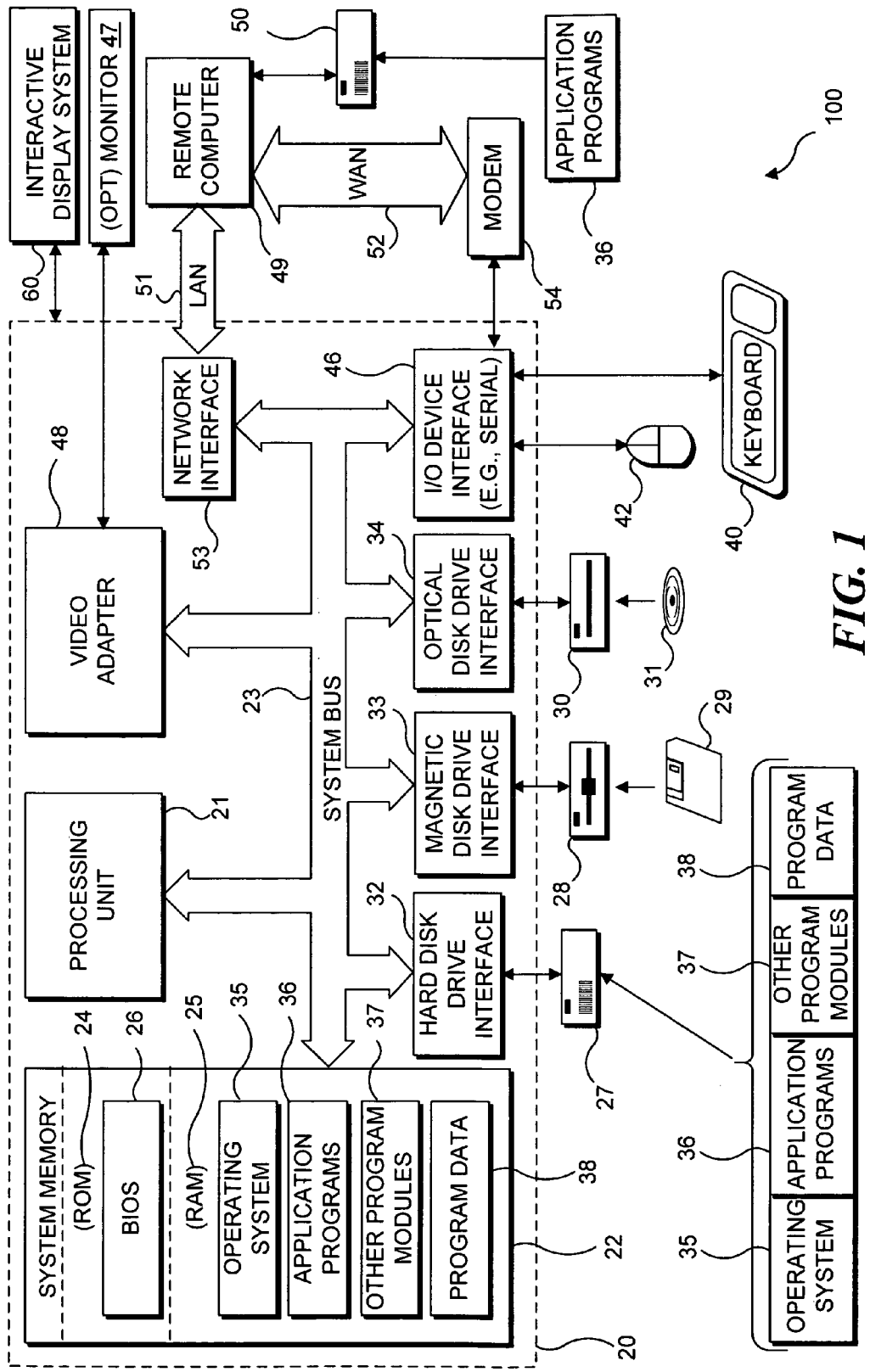
FIG. 1 is a functional block diagram of a generally conventional computing device or personal computer (PC) that is suitable for use with an interactive display surface in practicing the present technique for dynamically orienting a user interface presented on the interactive display surface.

FIG. 1 is a functional block diagram of an exemplary computing system and/or computer server for serving digital media to the computing device of connected clients, such as an interactive display table or a similar computing system.

The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 1, an exemplary system suitable for implementing various methods is depicted. The system includes a general purpose computing device in the form of a conventional personal computer (PC) 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the described exemplary environment employs a hard disk 27, removable magnetic disk 29, and removable optical disk 31, those skilled in the art will recognize that other types of computer readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules may be stored on the hard disk 27, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the presently described embodiments, such conventional pointing devices may be omitted, since the user can employ an interactive display system for input and control. As used in this description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers, or the interactive display table described in detail below. These and other input/output (I/O) devices can be connected to processing unit 21 through an I/O interface 46 that is coupled to system bus 23. The phrase "(I/O) interface" is intended to encompass each interface specifically used for a serial port, a parallel port, a game port, a keyboard port, and/or a universal serial bus (USB). System bus 23 can also be connected to a camera interface (not shown), which is coupled to an interactive display 60 in order to receive signals from a digital video camera that is included within interactive display 60, as discussed in greater detail below. The digital video camera may be instead coupled to an appropriate serial I/O port, such as to a USB port. System bus 23 can also be connected through I/O interface 46 or another interface, to a light source within an interactive display in order to provide control signals to the light source, as discussed in greater detail below. Furthermore, system bus 23 can also be connected through I/O interface 46 or another interface to a light detector within an interactive display system in order to receive user input. Optionally, a monitor 47 can be connected to system bus 23 via an appropriate interface, such as a video adapter 48; however, the monitor will likely be omitted, since the interactive display system described below can provide a much richer display and also interact with the user for input of information and control of software applications and is therefore preferably coupled to the video adaptor. In general, PCs can also be coupled to other peripheral output devices (not shown), such as speakers (through a sound card or other audio interface—not shown) and printers.

Certain methods described in detail below, can be practiced on a single machine, although PC 20 can also operate in a networked environment using logical connections to one or more remote computers, such as a remote computer 49. Remote computer 49 can be another PC, a server (which can be configured much like PC 20), a router, a network PC, a peer device, or a satellite or other common network node, (none of which are shown) and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
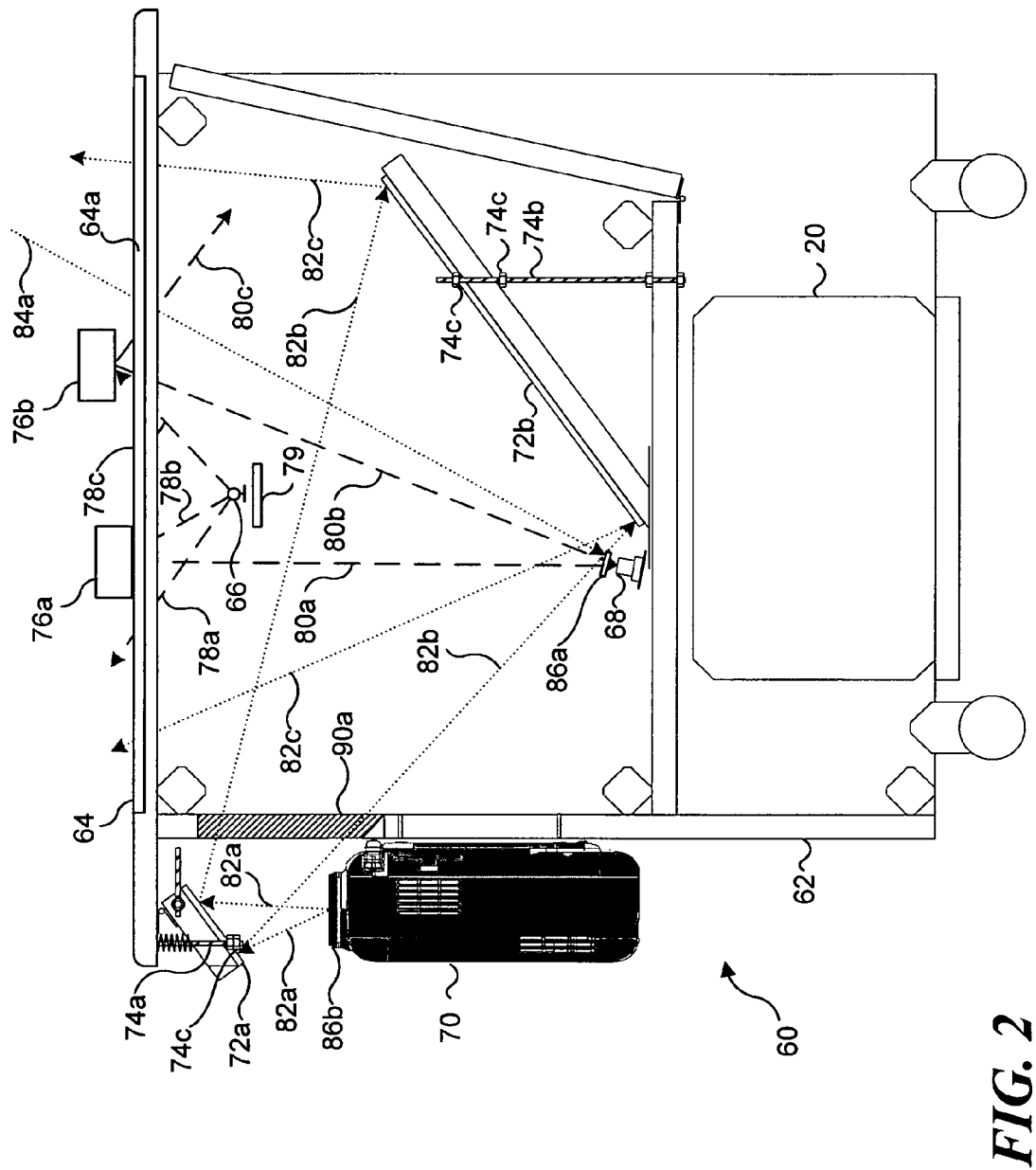
FIG. 2 is a cross-sectional view illustrating internal components of one exemplary embodiment having an interactive display surface at the top of an interactive display table that includes an integral PC.

In FIG. 2, an exemplary interactive display table 60 is shown that includes PC 20 within a frame 62 and which serves as both an optical input and video display device for the computer. The depicted embodiment is a cut-away figure of one implementation of interactive display table 60. In the embodiment shown in FIG. 2, rays of light 82a-82c used for displaying text and graphic images are illustrated using dotted lines, while rays of infrared (IR) light used for sensing objects on or just above an interactive display surface 64 of interactive display table 60 are illustrated using dashed lines. The perimeter of the table surface is useful for supporting a user's arms or other objects, including objects that may be used to interact with the graphic images or virtual environment being displayed on interactive display surface 64.

Light source 66 can comprise any of a variety of light emitting devices, such as a light emitting diode (LED), laser diode, and other suitable light sources that can be driven to scan in two orthogonal dimensions, i.e., in the X and Y directions. A scanning mechanism can be used with light source 66 and for each of the other light sources discussed below such as a rotating mirror, a galvanometer mirror, or other well known scanning mechanisms commonly used for producing a raster scan of a surface with a light beam. In general, light source 66 is configured for emitting light having a wavelength in the infrared (IR) spectrum, which is therefore not visible to the human eye. However, any wavelength of light can be used that is invisible to the human eye, so as to avoid interfering with the display of visible images provided on interactive display surface 64. Light source 66 can be mounted in any position on the interior side of frame 62, depending on the particular light source used. The light that is produced by light source 66 is directed upwardly toward the underside of interactive display surface 64, as indicated by dashed lines 78a, 78b, and 78c. Light emitted from light source 66 is reflected from any objects that are on or adjacent to interactive display surface 64 after passing through a translucent layer 64a of the table, comprising a sheet of vellum or other suitable translucent material with light diffusing properties.

As used in the description and claims that follow, the term "proximate to" is used with the intent that this phrase encompass both an object that is either touching the interactive display surface or is separated from the interactive display surface by short distance, e.g., by up to 3 centimeters or more, depending on factors such as the reflectivity of the object. Although only one light source 66 is shown, it will be appreciated that a plurality of such light sources may be mounted at spaced-apart locations around the interior sides of frame 62 to provide an even illumination of the interactive display surface. The light produced by light source 66 may either exit through the table surface without illuminating any objects, as indicated by dash line 78a; illuminate objects on the table surface, as indicated by dash line 78b; and/or illuminate objects a short distance above (i.e., proximate to) the interactive display surface but not touching it, as indicated by dash line 78c.

Objects above interactive display surface 64 include a "touch" object 76a that rests "on" or at least partially touches the display surface, and a "hover" object 76b that is close to, but not in actual contact with the interactive display surface. Thus, both touch and hover objects can be "adjacent to" the display surface, as that term is used in the following description. As a result of using translucent layer 64a under the interactive display surface to diffuse light passing through the interactive display surface, as an object approaches the top of interactive display surface 64, the amount of IR light that is reflected by the object increases to a maximum level when the object is actually in contact with the display surface.

As illustrated in FIG. 2, a light detector 68 is mounted to frame 62 below interactive display surface 64, in a position appropriate to detect IR light that is reflected from a "touch" object or "hover" object disposed above (i.e., adjacent to) the interactive display surface. In general, light detector 68 can be any light detection device suitable for detecting light reflected from objects on or adjacent to interactive display surface 64. For example, light detector 68 can be an area CMOS or area charged coupled device (CCD) sensor. While the implementation shown in FIG. 2 depicts one light detector 68, a plurality of light detectors 68 can be employed within interactive display 60. Light detector 68 can be equipped with an IR pass filter 86a that transmits only IR light and blocks ambient visible light traveling through interactive display surface 64 along dotted line 84a. In this implementation, a baffle 79 is disposed between scanning light source 66 and the light detector 68 to prevent IR light that is directly emitted from scanning light source 66 from entering light detector 68, since it is preferable that light detector 68 produce an output signal that is only responsive to IR light reflected from objects that are adjacent to interactive display surface 64. It will be apparent that light detector 68 will also respond to any IR light included in the ambient light that passes through interactive display surface 64 from above and into the interior of the interactive display, including ambient IR light that also travels along the path indicated by dotted line 84a.

IR light reflected from objects on or above the table surface may be: (a) reflected back through translucent layer 64a, through IR pass filter 86a and into light detector 68, as indicated by dash lines 80a and 80b; or, (b) reflected or absorbed by other interior surfaces within the interactive display 60 without entering light detector 68, as indicated by dash line 80c.

Translucent layer 64a diffuses both incident and reflected IR light. Thus, as explained above, "hover" objects such as hover object 76b that are closer to interactive display surface 64 will reflect more IR light back to light detector 68 than objects of the same reflectivity that are farther away from the display surface. Light detector 68 senses the IR light reflected from "touch" and "hover" objects within its operating field and produces a detection signal corresponding to the reflected IR light that it receives. This detection signal is input to PC 20 for processing to determine a location of each such object, and optionally, other parameters, such as the size, orientation, shape, and trajectory of the object. It should be noted that a portion of an object, such as a user's forearm, may be above the table while another portion, such as the user's finger, is in contact with the display surface. In addition, other parameters associated with an object may be detected. For example, an object may include an IR light reflective pattern or coded identifier, such as a bar code, on its bottom surface that is specific to that object or to a class of related objects of which that object is a member. Accordingly, the detection signal from one or more light detectors 68 can also be used for detecting each such specific object, as well as determining other parameters of the object or associated with the object, in response to the IR light reflected from the object and/or from a reflective pattern.

Embodiments are thus operable to recognize an object and/or its position relative to the interactive display surface 64, as well as other information, by detecting its identifying characteristics using the reflected IR light from the object. Details of the logical steps implemented to thus detect and identify an object, its orientation, and other parameters are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference (as background information), but are not viewed as essential to enabling the novel approach claimed below.

Figure 3:
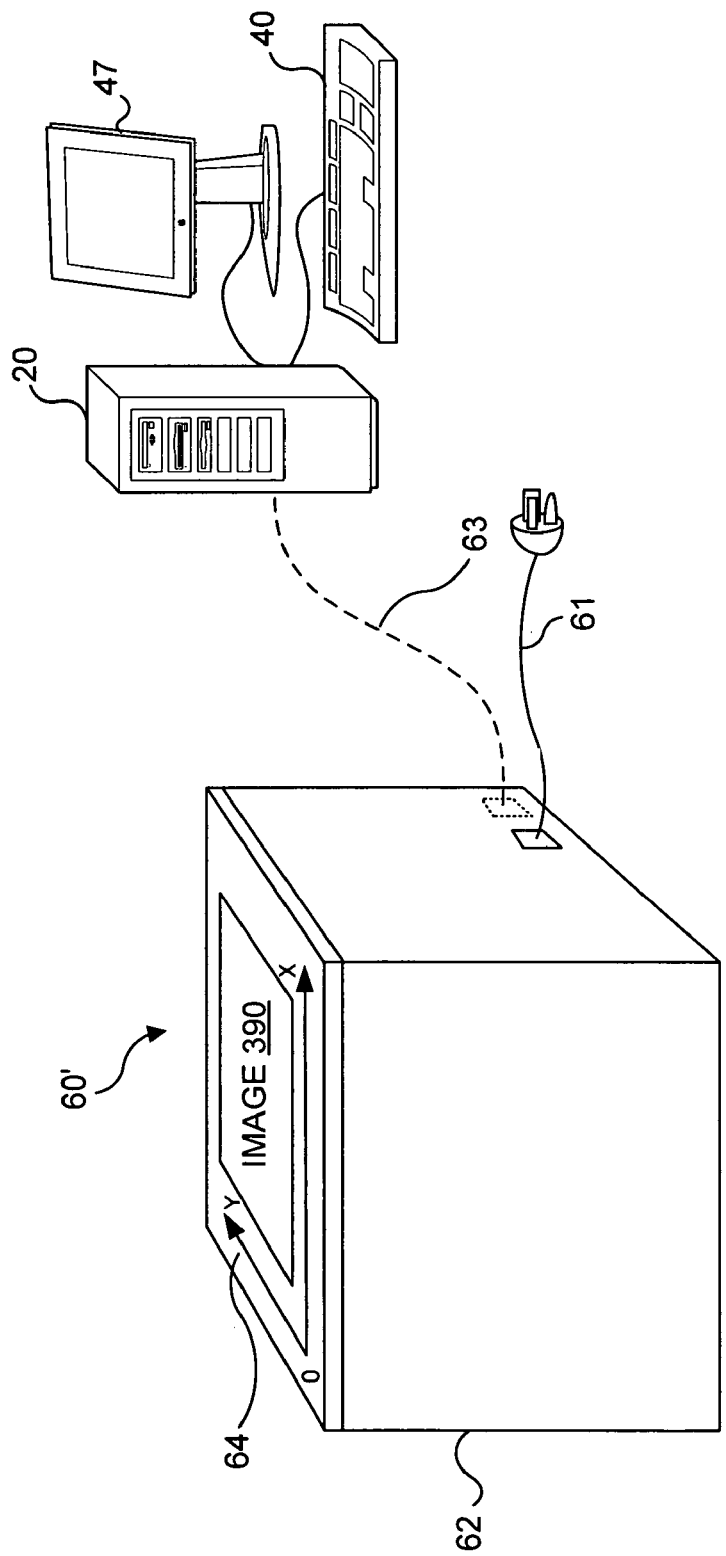
FIG. 3 is an isometric view of an exemplary embodiment in which the interactive display table is connected to an external PC.

PC 20 may be integral to interactive display table 60, as shown in the embodiment of FIG. 2, or alternatively, may be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with interactive display surface 64, as well as an origin indicated by "0." An exemplary projected image 390 is also illustrated as the word "IMAGE" on display surface 64. While not discretely shown, it will be appreciated that a plurality of coordinate locations along each orthogonal axis can be employed to specify any location on interactive display surface 64.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display system, or externally, PC 20 executes algorithms for processing the digital images from digital video camera 68 and executes software applications that are designed to employ the more intuitive user interface functionality of the interactive display table to good advantage, as well as executing other software applications that are not specifically designed to make use of such functionality, but can still make good use of the input and output capability of the interactive display table. As yet a further alternative, the interactive display system can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable a user interaction with the graphic image or virtual environment visible on interactive display surface 64, by identifying objects (or characteristics thereof) that are resting atop the display surface, such as an object 76a, or that are hovering just above it, such as an object 76b.

Again referring to FIG. 2, interactive display table 60 can include a video projector 70 that is used to display graphic images, a virtual environment, or text information on interactive display surface 64. The video projector can be a liquid crystal display (LCD) or digital light processor (DLP) type, or a liquid crystal on silicon (LCoS) display type, with a resolution of at least 640×480 pixels, for example. An IR cut filter 86b can be mounted in front of the projector lens of video projector 70 to prevent IR light emitted by the video projector from entering the interior of the interactive display table housing where the IR light might interfere with the IR light reflected from object(s) on or above interactive display surface 64. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64a, which is at the focal point of the projector lens, so that the projected image is visible and in focus on interactive display surface 64 for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64a to enable a longer focal length (and lower cost) projector lens to be used with the projector. In some alternate implementations, an LCD panel or an organic light emitting display (OLED) panel can be employed instead of a video projector for displaying text and images comprising a graphical user interface. Similarly, other techniques can be employed for sensing objects in contact with or proximate to the interactive display surface.

The foregoing and following discussions describe an interactive display device in the form of interactive display table 60 and 60'. Nevertheless, it is understood that the interactive display surface need not be in the form of a generally horizontal table top. The principles described in this description suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent to the display surface.

Exemplary Methods for Implementing an Orientable GUI

Figure 4:
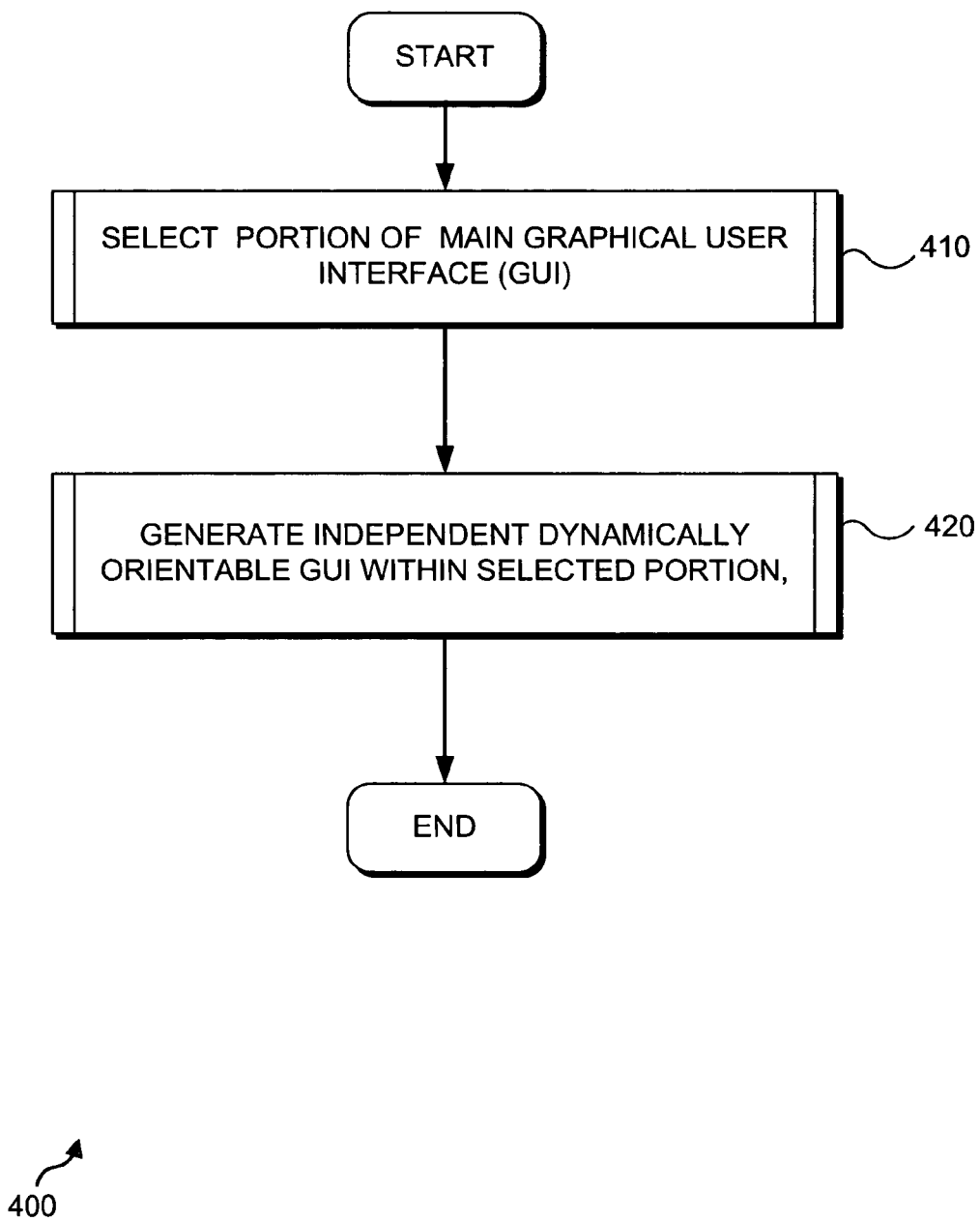
FIG. 4 is a flow diagram illustrating the steps of an exemplary method for configuring a user interface with dynamically orientable user input controls.

Each of FIGS. 4 and 5, as described in detail below, are flow diagrams illustrating the steps of exemplary methods 400 and 500, respectively, for configuring a user interface with dynamically orientable user input controls. Methods 400 and 500 can be implemented in some embodiments with components, and techniques, as discussed above with reference to FIGS. 1-3. In some implementations, one or more steps of methods 400 and 500 are embodied on a computer-readable medium containing computer-readable code so that a series of steps are implemented when the computer-readable code is executed on a computing device, such as the processor included within PC 20. In the following description, various steps of methods 400 and 500 are described with respect to a processor of a computing device that is associated with an interactive display system that can perform certain method steps. However, the interactive display system can also be in communication (as appropriate) with another computing device that can also perform certain method steps. In some implementations, certain steps of methods 400 and 500 can be combined, performed simultaneously, or in a different order, without deviating from the objective of the methods or without producing different results.

Method 400 begins at a step 410, when a portion of a graphical user interface (GUI) is selected. The portion can be selected at any time after a computer processor is enabled to implement computer executable instructions, such as may be contained in an executable software module that is employed to carry out various functions. In one exemplary implementation, the portion of the main graphical interface can be selected at the invocation of an application that requires a dynamically orientable user interface for optimal functionality (e.g., to more effectively enable interaction by users disposed at different sides of the interactive display table). In one implementation, the selected portion of the main GUI defines a display field or region in which a second portion of the GUI can reside. In some implementations, the selected portion circumscribes a main part of the GUI, in whole or in part. In other implementations, the selected portion can be contiguous around a perimeter of the main part of the GUI. However, the selected portion of the GUI can be any desired subset of the GUI such that the orientable GUI can be implemented within the selected portion. As such, it is not required that the selected portion be along a perimeter of the main part of the GUI, but instead, can be disposed closer to a center of the main part of the GUI, and can be of any suitable shape that enables an orientable GUI.

In a step 420, an orientable GUI is generated within the selected portion of the main part of the GUI. In some implementations, the orientable GUI is independent of the main part of the GUI and is dynamically orientable (e.g., rotated) about a perimeter of the main GUI. In other implementations, a dynamically orientable GUI provides one or more user input controls that can be enabled to rotate freely within the selected portion in which the orientable GUI is generated. In still other implementations, a user control can be rotatable along an axis of the selected portion. In some applications, the orientation of the user input control can be based on a user input to the orientable GUI. As used herein, the term "orientable GUI" is a displayed image that can be oriented (e.g., rotated or otherwise moved to change its orientation) relative to a fixed main part of the GUI. The orientable GUI can thus be dynamically oriented to enable different specific users to more readily visually perceive and interact with at least a portion of the orientable GUI or to appropriately display at least a portion of the orientable GUI for ease of readability and ease of interaction relative to different user positions around the interactive display table. Specific examples of an orientable GUI are illustrated in FIGS. 6A-B and 7A-B, which are discussed below.

One implementation of method 400 includes additional steps, such as identifying when a user input is received from the dynamically orientable GUI. In this implementation, a present position of the user input control is a first identified. The present position is determined relative to a predetermined position within the selected portion of the display, such as an origin point, which can be assigned when the orientable GUI is instantiated. In one example, the user input control can be, for example, a button that may be activated by a user with a finger or an object that is positioned proximate to the button location on the interactive display surface. Another step of the present implementation can include determining if the user input indicates an invocation to reorient or rotate the user input control relative to a present position of the control determined in the prior step. Based on this user input, the orientable GUI can then be dynamically rendered in order to implement a rotation or reorientation of the user control within the selected portion of the interactive display in which the orientable GUI resides.

In another implementation, the step of identifying when the user input is received by the orientable GUI further includes a step of detecting an object that has been disposed proximate to a selected portion of an interactive display within which the orientable GUI is displayed.

Another implementation can include steps such as determining input parameters corresponding to the physics of motion of a user finger or user controlled object. In this implementation, the parameters can include a speed and a direction of a user input. The determination can be based on the user input directed to the orientable GUI, such as input provided by a user's finger, hand, or object held by the user. In a next step, the input parameters that were determined can be applied to dynamically control the speed and the direction of the change in orientation of the user controls as the orientable GUI is again rendered. In general, the parameters relating to the physics of motion are first calculated based on the user input, and then used during the rendering phase to control the display of user controls within the orientable GUI. In other implementations, however, the entire orientable GUI field may be reoriented in accord with the physics of motion, based on the parameters that were determined, during a rendering of the GUI to the display.

Yet another implementation can include a step of determining a braking parameter. In some implementations the braking parameter can be proportional to the speed that was determined. Generally, the braking parameter defines a rate of speed decay of a reorientation (e.g., rotation) of the user control when the orientable GUI is being dynamically rendered. In some implementations, the braking parameter can be based on user input received to a user interface. In one example, the braking parameter can be based on detecting a user's hand or finger proximate to a region of an interactive display upon which the orientable GUI is displayed.

Still another implementation can include a step of determining when the user input indicates an invocation of the user control, and in response, implementing a predetermined function associated with the user control. The predetermined function can include, for example, invoking an application, providing user input functionality to an application, and terminating an application.

Figure 5:
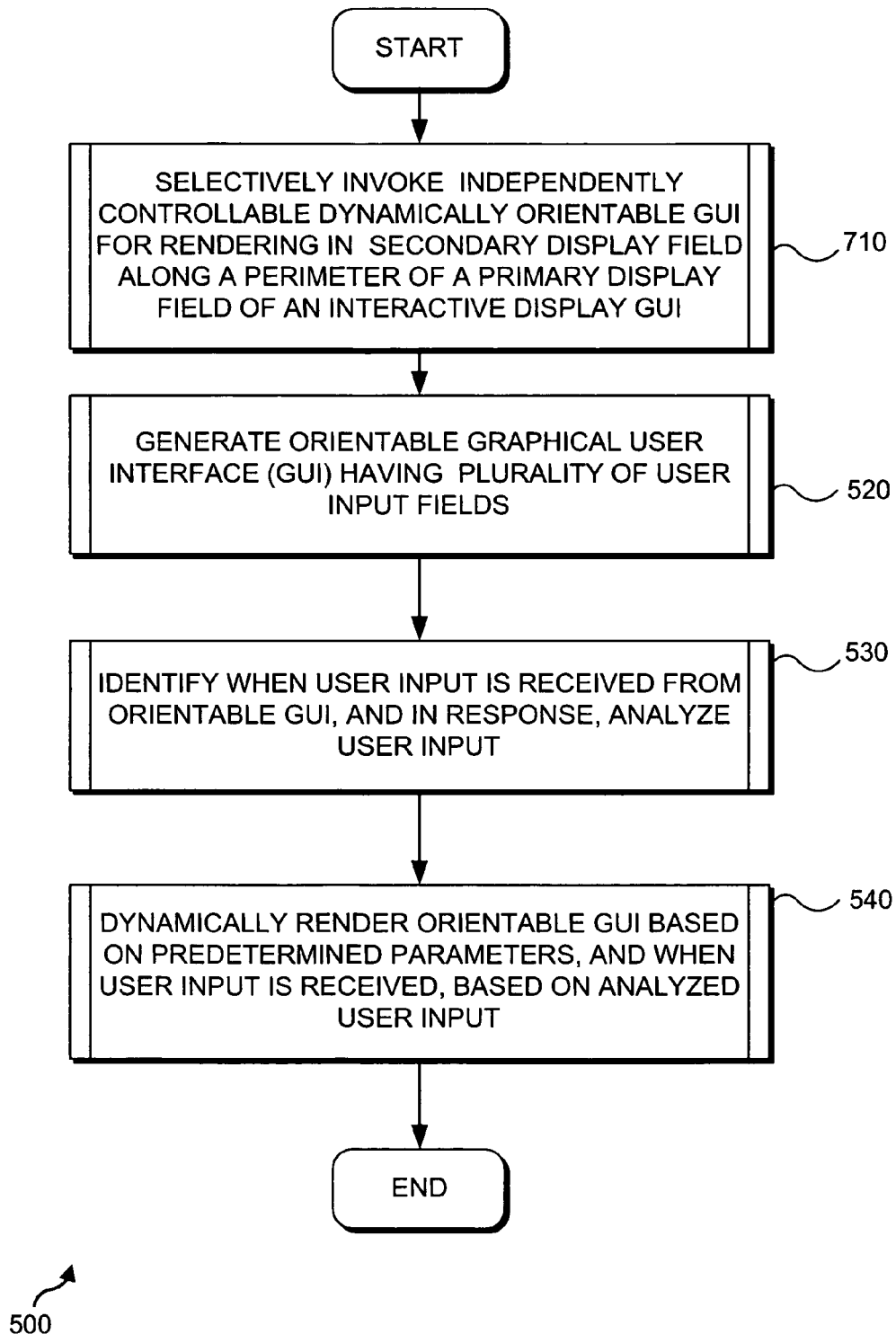
FIG. 5 is a flow diagram illustrating the steps of an exemplary method for configuring a user interface with dynamically orientable user input controls in response to a user input.

Turning now to FIG. 5, a method 500 for configuring a user interface of an interactive display with a dynamically orientable GUI in response to a user input is illustrated. Method 500 is particularly suitable for implementation by a computing device and in at least one implementation, is embodied as computer readable instructions stored on a computer-readable medium. Method 500 begins in a step 510 when an orientable GUI is selectively invoked. In some implementations, the orientable GUI is independently controllable and dynamically orientable based on parameters such as a user input. Generally, the interactive display includes a primary display field in which images and user interface elements can be displayed and for interaction by a user. In some implementations, the orientable GUI can be rendered in a secondary display field proximate a periphery of the primary display field. The orientable GUI can be selectively invoked at any time that an interactive display application is active.

In a step 520, the orientable GUI is generated in response to the invocation. In some implementations, the orientable GUI provides a plurality of user input fields, such as user input controls that may be activated by a user's finger, hand, or user-controlled object being brought into contact with or proximate to the controls. In other implementations, the orientable GUI can be configured to enable dynamic displacement of the orientable GUI along a path within the secondary field in response to a user input to the orientable GUI. Reference may be made in particular to FIGS. 6A-B, as discussed below, for an illustration of this functionality. In still another implementation, the change in orientation can be in response to an application selectively reorienting the orientable GUI to enable a specific user to more readily access and interact with a control or other portion of the orientable GUI.

A step 530 includes identifying when a user input is received from the orientable GUI, and in response, analyzing the user input. The identification of a user input can occur at any time after the orientable GUI is generated. In one implementation, the user input is received from the orientable GUI. In another implementation, the user input is analyzed for input parameters such as the speed and/or direction (or other parameters relating to the physics of motion) of the object providing the input.

In a step 540, the orientable GUI is dynamically rendered based on one or more predetermined parameters. In one implementation, when a user input is received, the user input that is analyzed can also be used to dynamically control the orientation of the orientable GUI. In one implementation, the orientable GUI will be continuously dynamically rendered at a rate sufficient to display moving images on an interactive display surface without lag or other visual glitches. In operation, the orientable GUI can be dynamically rendered to an interactive display many times per second, enabling the appearance of fluid motion of the orientable GUI and the user input controls as their orientation changes.

Another implementation includes a step of identifying a present disposition of the orientable GUI relative to a predetermined position on the interactive display. In this implementation, the predetermined position can be an anchor position, a presently identified position or an initial position that is assigned when the orientable GUI is invoked, generated or was last or first rendered. This implementation can include additional steps, such as determining if the user input indicates a user invocation to displace the orientable GUI relative to its present disposition, as identified in the previous step. Next, a positional displacement (i.e., reorientation) of the orientable GUI relative to the present disposition can be determined, based on the user input. A final step of this implementation can include applying the determined positional displacement in order to dynamically render the orientable GUI in a new orientation.

Another implementation can include a step of determining input parameters for the physics of motion, based on the user input received in the orientable GUI, such as input by a user's finger, hand, or user-controlled object. Again, in this implementation, the determined input parameters can be applied to dynamically control the speed of the positional displacement and the displacement direction of the orientable GUI as the orientable GUI is rendered. It will be apparent to the skilled practitioner that other parameters can be determined based on the user input to the orientable GUI, which can then be used during the GUI rendering process. For example, another parameter that can be determined is a braking parameter. The braking parameter can define a rate of speed decay in regard to the positional displacement of the orientable GUI as the orientable GUI is rotating or otherwise moving while being dynamically rendered. Thus, the braking parameter causes the visually perceived rate of rotation of the orientable GUI to slow over time, as the orientable GUI eventually comes to a complete "stop" in a desired new displaced position and at a new orientation. This braking parameter can be based on predetermined models based on the laws of physics or user input such as user's hand or finger when it is detected proximate to a region of an interactive display that is displaying the orientable GUI.

Still another implementation can include a step of detecting an object proximate to one or more of the user input fields within the orientable GUI when the orientable GUI is displayed on the interactive display surface. This implementation can include a further step of determining if the user input indicates an invocation of the user control, and if so, a predetermined function associated with the user control can be implemented. In one implementation the predetermined function can include a step of invoking a process that is independent of an orientable GUI control process, such as starting execution of a new application by the interactive control system. In another implementation, the predetermined function can include providing a user control to a currently running process that is independent of the orientable GUI control process.

An example of a process that is independent of the orientable GUI control process is a paint program in which a user can use a finger to "paint" on the interactive display surface. In yet another implementation, the predetermined function can include providing user control of the orientable GUI control process. In this implementation, providing user control to the orientable GUI control process itself can include enabling control of the appearance, rotation rate or direction, or other parameter of the orientable GUI based on direct user input to the orientable GUI. In still another implementation, the predetermined function can include terminating a process.

Exemplary Orientable GUI Displayed on Interactive Display Surface

Figure 6A:
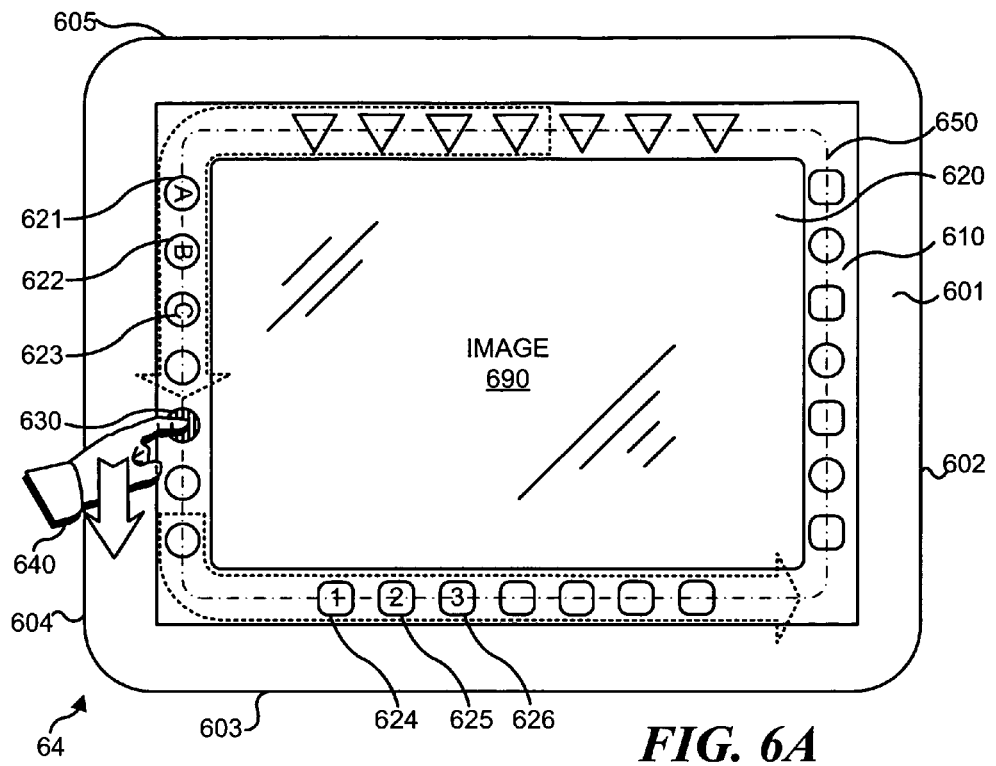
FIG. 6A is a schematic top view of an interactive display surface that includes a dynamically orientable user interface.
Figure 6B:
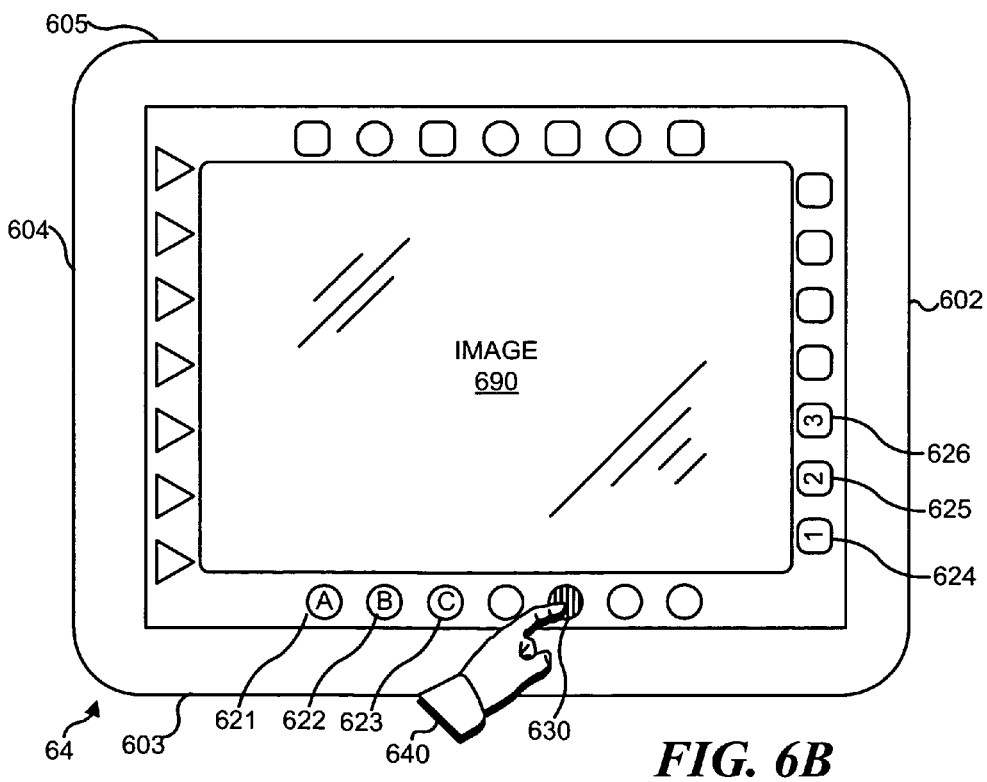
FIG. 6B is a schematic top view of an interactive display surface that includes a dynamically orientable user interface, showing how a user interface illustrated in FIG. 6A has been reoriented for interaction by a user at a different side of the interactive display surface.

FIGS. 6A and 6B illustrate one implementation of the systems and techniques described with reference to FIGS. 1-5. Both FIGS. 6A and 6B show a top view of an interactive display surface 64, which includes a dynamically orientable (e.g., rotatable) GUI 610 that is being controlled to orient the GUI appropriate for view and interaction by a user 640. As illustrated in FIG. 6A, interactive display surface 64 has a perimeter 601 comprising a side 602, a side 603, a side 604, and a side 605. An apron 601, which generally surrounds the interactive display surface, is useful for supporting the hands and limbs of users as well as objects that may be used for interacting with applications such as games that are executed by the interactive display system. It should be understood that while interactive display surface 64 is illustrated as being four-sided, an interactive display surface may actually have more or fewer than four sides, or be round or oval. In this example, GUI 610 is illustrated as a rectangular band, that extends around the perimeter of an "active" display area of interactive display surface 64. This "active" display area is a field of interactive display surface 64 that contains both orientable GUI 610 and a main part of user interface display 620, which can be used to display other images. It should be noted that GUI 610 can have any suitable shape, and is not limited to a band around the periphery of the main part of the interactive display surface. An illustrative image 690 is depicted by the word "IMAGE" appearing near the center of the main part of user interface display 620. It should be noted that illustrative image 690 can be, for example: another user interface, or displayed as part of an application running independently from GUI 610, or a picture, or a graph, or almost any other type of image that may be displayed on interactive display surface 64.

In this example, GUI 610 is generally configured to be oriented by "rotating" around the perimeter of main user interface display 620, such that user controls within the field of GUI 610 move in a clockwise or counterclockwise direction along a line 650 running around the center of the band comprising GUI 610. Three user controls 621, 622, and 623, labeled "A," "B," and "C," respectively, are illustrated within GUI 610, as being currently positioned in a row along side 604. A second set of user controls 624, 625, and 626 labeled "1," "2," and "3," respectively, is illustrated within GUI 610, as being currently positioned in a row along side 603. Furthermore, a user control 630 (e.g., a button) is illustrated being invoked (or actuated) by user 640. Furthermore, the user's hand is also moving counterclockwise, causing GUI 610 to be rotated in a counterclockwise direction concurrently with the user invocation of control 630.

In operation, when the user's finger is placed on the user control in the position as it appears on the interactive display surface (i.e., as illustrated in FIG. 6A), the user control or button is invoked. Furthermore, the user's finger can then "drag" the invoked user control, along with the rest of the controls within GUI 610, along line 650. When the user's finger is removed from interactive display surface 64, the user control that was dragged by the user's finger will settle into a new location around the perimeter of the main part of user interface display 620. The rotation of the user input buttons along line 650 can stop when the user's finger is removed, or can continue after the user's finger is removed. A continued rotation of GUI 610 can be based on the laws of physics, using parameters such as the measured speed and direction of the user's finger as the finger moves over the interactive display surface, as determined by the computing device disposed within or coupled to the interactive display table. In this manner, it is possible for a user to "flick" a user input control with a sweeping motion that has a particular velocity (speed and direction), and thereby both invoke the control and also initiate a reorientation (or rotation) of GUI 610.

FIG. 6B illustrates a further aspect of the example discussed above in connection with FIG. 6A, but GUI 610 is depicted in a displaced position or new orientation, in reference to the position illustrated in FIG. 6A. The position or orientation of GUI 610 can be considered to be a present or an initial position relative to the new position of the GUI after the user has caused the GUI to be reoriented. The displacement illustrated in FIG. 6B is based on the user input provided by sensing the movement of the user's finger, in order to illustrate the rotational functionality of GUI 610. As can be seen in FIG. 6B, user input controls 621, 622, and 623 (i.e., buttons) have been caused to rotate counterclockwise by about 90° and are now positioned along side 603. Similarly, user input controls 624, 625, and 626 (i.e., buttons) have been caused to rotate around the perimeter counterclockwise by about 90° and are now positioned along side 602 of interactive display surface 64.

The illustrated exemplary embodiment can be useful when interactive display surface 64 has four sides, and when multiple users desire to interact with the interactive display surface from their respective locations at different sides around the interactive display table. In one example, a game can be played by four users who access a game board displayed within main user interface 620, while different controls for the game are displayed along the four sides of interactive display 64 within GUI 610. The game application can then dynamically orient the user controls as required to enable any of the users to more conveniently access a specific set of the controls by reorienting the GUI so that a controls that will be activated by a user is positioned in front of that user. In this example, it may be useful to provide rotational functionality to user input controls within GUI 610 such that a player may "pass" the controls to an adjacent player playing from a different side of interactive display 64, or so that a player who wants to activate a desired control that is currently disposed at a different side of the interactive display table from that at which the player is disposed, can cause the desired control to be rotated around the periphery of the interactive display surface until the desired control is disposed in front of the player.

Figure 7A:
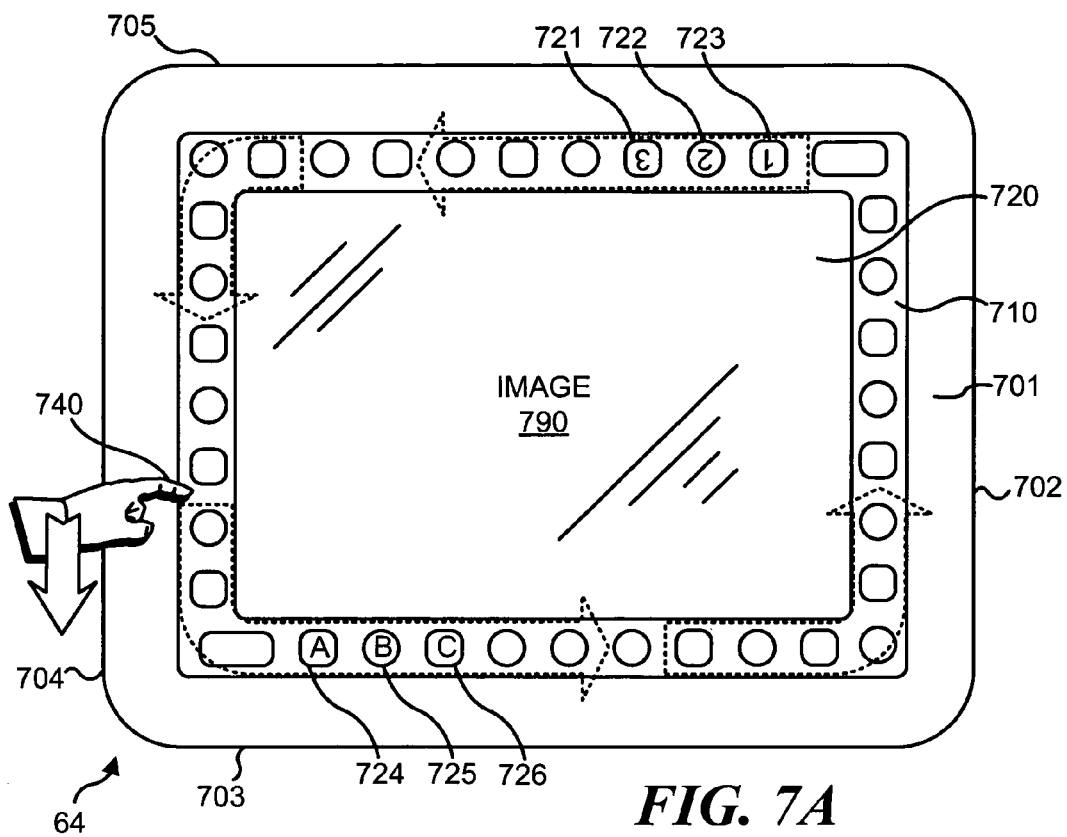
FIG. 7A is a schematic top view of an interactive display surface that includes a dynamically orientable user interface.
Figure 7B:
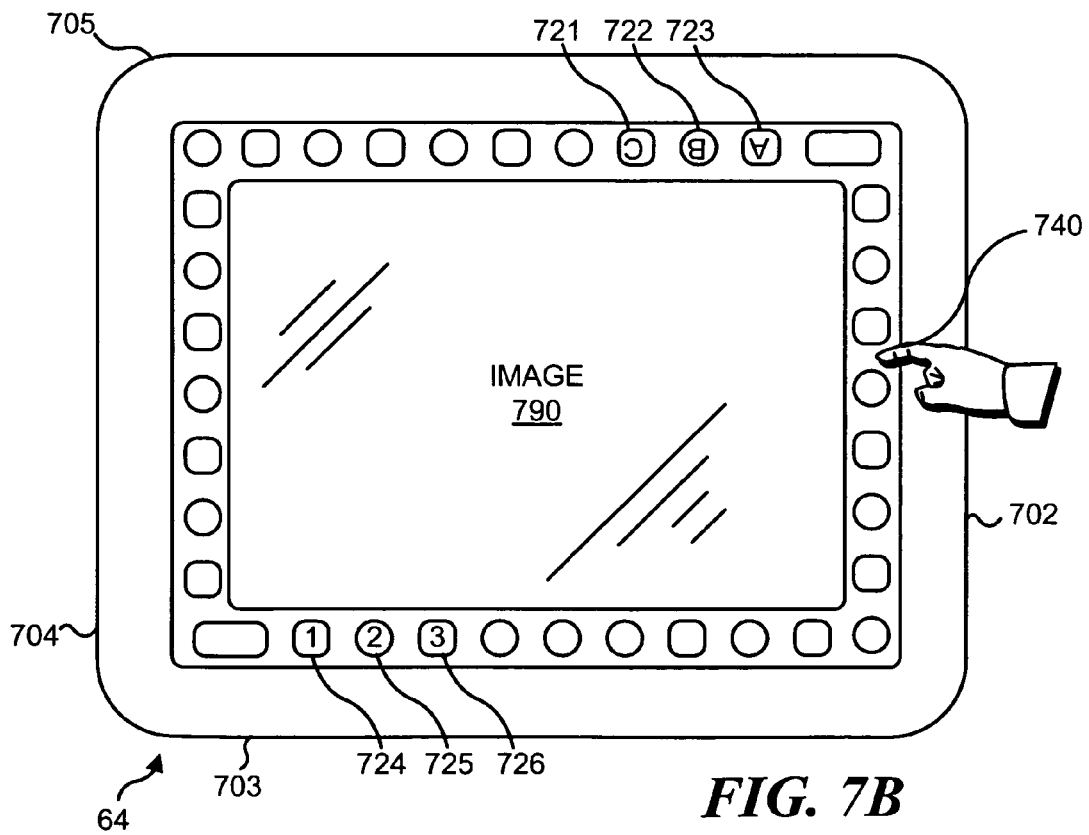
FIG. 7B is a schematic top view of an interactive display surface illustrating the dynamically orientable user interface of FIG. 7A, after the user interface has been reoriented;.

FIGS. 7A and 7B illustrate another exemplary implementation of the system and approaches described with reference to FIGS. 1-5. FIGS. 7A and 7B, again illustrate a schematic top view of interactive display surface 64, displaying an orientable user interface being manipulated by a user. As illustrated in FIG. 7A, the interactive display surface 64 again has an apron 701 and includes a side 702, a side 703, a side 704, and a side 705. An orientable GUI 710 is again illustrated as shaped like a band that extends around the perimeter of a primary display area 720. An illustrative image 790 is again depicted by the word "IMAGE" disposed near the center of the main part of user interface display 720.

Orientable GUI 710 is generally configured to be rotatable around the perimeter of the main user interface display 720, such that the field of orientable GUI 710 moves in either a clockwise or a counterclockwise direction. The reorientation of GUI 710 in this manner is analogous to the function of a "lazy Susan" tray, since rotation of a lazy Susan causes objects placed upon the tray to rotate about the midpoint of the lazy Susan for easy access by users disposed around the lazy Susan tray. According to this analogy, user input controls or buttons are analogous to objects placed upon the lazy Susan tray, and orientable GUI 710 is analogous to the tray frame, since the orientable GUI supports the user input controls and thereby enables a dynamically reorientation of the GUI as it rotates around the main part of user interface display 720. It should again be noted that a dynamically orientable GUI need not be located around a perimeter of a primary display area, but can be disposed almost anywhere on the interactive display surface. Thus, a dynamically orientable GUI can be also employed, for example, in an application in which it can simulate a rotating wheel for a word game. In such an application, the dynamically orientable GUI can be located where desired on the interactive display surface.

Three user controls 721, 722, and 723 labeled "A," "B," and "C," respectively, are illustrated within GUI 710 and are currently disposed in a continuous row along side 703. A second set of user controls 624, 625, and 626 labeled "1," "2," and "3," respectively, is illustrated within GUI 710 disposed in a continuous row along side 705. A user's finger 740 is illustrated as touching a point within GUI 710 along side 704. The present implementation is distinguished from that shown in FIGS. 6A and 6B by the fact that the user's finger is illustrated a point within GUI 710, but not touching or activating a user input control, such as user control 721. In FIG. 7A, the user's finger is shown causing orientable GUI 710 to be rotated in a counterclockwise direction. As illustrated, the user's finger is placed on GUI 710 and then "drag" GUI 720 and all of the user input controls contained within it around the circumference of primary display area 720. When the user's finger is removed from interactive display surface 64, the position of GUI 710 will settle at a new location around the perimeter of main user interface display 720. The rotation of GUI 710 can stop immediately upon removal of the user's finger, or alternatively, can continue rotating after the user's finger is removed based on the laws of physics, by applying parameters such as speed and direction, as described above.

Similarly, a user can stop rotation of GUI 710 when it is in motion simply by placing a finger upon a part of the still rotating orientable GUI.

In this manner, it is also possible for a user to "flick" a part of orientable GUI 710 with a sweeping motion to initiate a rotation of orientable GUI 710, and slowing the rotation over time, with a decay rate that is based on the speed of the user input, or on a predetermined decay rate. FIG. 7B duplicates FIG. 7A, with the exception that orientable GUI 710 is depicted in a displaced position relative to that shown in FIG. 7A. The displacement can be caused by the user input provided from the user's finger (as illustrated in FIG. 7A). As can be seen in FIG. 7B, user input controls 721, 722, and 723 have been caused to move counterclockwise around the periphery of the interactive display surface by about 180° and are now positioned along side 705. Similarly, user input controls 724, 725, and 726 have been caused to move counterclockwise around the periphery of interactive display surface 64 by about 180° and are now positioned along side 703 of the interactive display surface.

It should be noted however, that the displacement illustrated in FIG. 7B can be continuously variable and need not be restricted to multiples of 90°, and need not correspond to the sides of interactive display 64. This capability to arbitrarily position the orientable GUI may be desirable if the user input controls are not specific to a user located on a particular side of interactive display surface 64, or if interactive display surface 64 were round. In one example, a "paint" application can have several users around the perimeter of interactive display 64, and the user must be able to readily access user input controls for selecting various "colors," sounds, and other effects. In this example, the user may wish to cause the controls to rotate around the interactive display surface in order to access a specific desired application functionality (e.g., to select a different color range, and the like) without concern for a user's position relative to a "side" of the interactive display surface. In this manner, the readily orientable GUI facilitates the user's access of the desired functionality.

Although various implementations have been described in connection with the preferred form of practicing what is considered novel and modifications thereto, those of ordinary skill in the art will understand that many other modifications can be made to these implementations within the scope of the claims that follow. Accordingly, it is not intended that the scope of what is perceived by the applicants as novel in any way be limited by the above description, but instead be determined entirely by reference to the claims that follow.

The novel aspects in which an exclusive right is claimed are defined by the following:

1. A computer implemented method for controlling a user interface of an interactive display with dynamically orientable user input controls, comprising the steps of:
    (a) selecting a portion of a primary graphical user interface (GUI) of an interactive display table to be readily orientable, the primary graphical user interface being arranged around the perimeter of the interactive display table;
    (b) generating an orientable GUI within the portion selected, the orientable GUI extending around the interactive display table within the primary graphical user interface, the orientable GUI including a plurality of user input controls that are arranged around the interactive display table and can be dynamically reoriented within the portion selected, based on a user input to the orientable GUI wherein the orientable GUI is reoriented by being rotated around the perimeter of the interactive display table;
    (c) receiving user input at the dynamically orientable GUI, the user input comprising the user's finger touching a portion of the interactive display table above one of the plurality of user input controls of the orientable GUI such as to select one of the user input controls and sliding across the interactive display table, and in response, identifying a present position of the plurality of user input controls relative to a predetermined position within the portion selected;
    (d) determining that the user input indicates a user invocation to rotate the plurality of user input controls relative to the present position; and
    (e) dynamically rendering the orientable GUI to implement a reorientation of the plurality of user input controls within the portion selected relative to the predetermined position, wherein reorienting the at least one user control comprises:
        (i) determining a speed and a direction that the user's finger slides across the interactive display table;
        (ii) calculating a speed and a direction of rotation to be applied to the plurality of user input controls as they are dynamically rendered, the calculated speed being equal to the determined speed of the user's finger as it slides across the interactive display table;
        (iii) applying the calculated speed and direction of rotation to the plurality of user input controls to dynamically control the speed and direction of rotation of the plurality of user input controls as the orientable GUI is dynamically rendered such that upon applying the calculated speed and direction of rotation, the plurality of user input controls commence to rotate at the calculated speed and in the calculated direction and continue to rotate at the calculated speed in the calculated direction after the user input is received and even when no other input is being received indicating a user invocation to rotate the plurality of user input controls; and
        (iv) calculating a braking parameter that is proportional to the determined speed of the user input, the braking parameter defining a rate of decay in the calculated speed of rotation of the plurality of user input controls, and applying the braking parameter to the calculated speed of rotation of the plurality of user input controls such that the rotation is slowed by the braking parameter according to the rate of decay.

2. The method of claim 1, wherein the step of identifying when the user input is received at the orientable GUI further comprises the step of detecting an object at least proximate to the portion selected.

3. The method of claim 1, and further comprising the step of determining if the user input indicates an invocation of the at least one user control, and if so, implementing a predetermined function associated with the at least one user control.

4. The method of claim 1, wherein the portion selected at least partially extends around the primary GUI.

5. The method of claim 4, wherein the at least one user control is movable along a path extending within the portion selected.

6. The method of claim 4, wherein the portion selected is contiguous around a periphery of the primary GUI.

7. A tangible computer readable storage media having computer executable instructions stored thereon for carrying out a plurality of functions for controlling a user interface of an interactive display with dynamically orientable user input controls, the functions including:
    (a) selectively invoking an orientable graphical interface (GUI) as a secondary display field within a primary display field of an interactive display table, the primary display field being arranged around the perimeter of the interactive display table;

(b) in response to the invocation, generating the orientable GUI, the orientable GUI extending around the interactive display table within the primary display field, the orientable GUI including a plurality of user input fields arranged around the interactive display table and being configured to enable dynamic reorientation of at least a portion of the orientable GUI in response to a user input to the orientable GUI wherein the orientable GUI is reoriented by being rotated around the perimeter of the interactive display table;

(c) identifying when a user input is received at the orientable GUI, the user input touching a portion of the interactive display table above one of the plurality of user input fields of the orientable GUI such as to select one of the user input fields, the user input further comprising the user's finger sliding across the interactive display table, and in response, determining that the user input indicates a user invocation to rotate the plurality of user input fields; and (d) in response to the user input, dynamically rendering the orientable GUI to rotate the plurality of user input fields, wherein rendering the orientable GUI comprises:
  (i) determining a speed and a direction that the user's finger slides across the interactive display table;
  (ii) calculating a speed and a direction of rotation to be applied to the plurality of user input fields as they are dynamically rendered, the calculated speed being equal to the determined speed of the user's finger as it slides across the interactive display table;
  (iii) applying the calculated speed and direction of rotation to the plurality of user input fields to dynamically control the speed and direction of rotation of the plurality of user input fields as the orientable GUI is dynamically rendered such that upon applying the calculated speed and direction of rotation, the plurality of user input fields commences to rotate at the calculated speed and in the calculated direction and continues to rotate at the calculated speed in the calculated direction after the user input is received and further user input indicating a user invocation to rotate the plurality of user input fields has ceased; and
  (iv) calculating a braking parameter that is proportional to the determined speed of the user input, the braking parameter defining a rate of decay in the calculated speed of rotation of the plurality of user input fields, and applying the braking parameter to the speed of rotation of the plurality of user input fields such that the rotation is stopped by the braking parameter according to the rate of decay.

8. The computer readable storage medium of claim 7, wherein the functions further include identifying a present disposition of the orientable GUI relative to a predetermined position around a periphery of the primary display field.

9. The computer readable storage medium of claim 8, wherein the plurality of user input fields are rotated relative to the predetermined position.

10. The computer readable storage medium of claim 7, wherein the functions further include detecting an object proximate to at least one of the plurality of user input fields within the orientable GUI when the orientable GUI is displayed on the interactive display surface.

11. The computer readable storage medium of claim 7, wherein the functions further include determining if the user input indicates an invocation of one of the plurality of user input fields, and if so, implementing a predetermined function associated with the invoked user input field.

12. The computer readable storage medium of claim 11, wherein the predetermined function includes at least one of:
  (a) invoking a process that is independent of a process employed for controlling the orientable GUI;
  (b) providing a user control to a process that is independent of the process that is employed for controlling the orientable GUI;
  (c) providing a user control to the process that is controlling the orientable GUI; and
  (d) terminating a process.

13. An interactive display system for controlling a dynamically orientable user interface, comprising:
  (a) an interactive display surface on which graphic images are displayable;
  (b) an optical system for projecting the graphic images onto the interactive display surface and for detecting user input to the interactive display surface; and
  (c) a computing system in communication with the optical system, the computing system including a processor, and a memory in communication with the processor, the memory storing machine instructions that cause the processor to carry out a plurality of interactive display functions, including:
    (i) generating and displaying an orientable GUI on a selected portion of the interactive display surface, the orientable GUI extending around the interactive display table within a primary graphical user interface, the orientable GUI including a plurality of user input controls that are arranged around the interactive display table and that are independent of other graphic images displayed on the interactive display surface, and further, the orientable GUI being enabled to be dynamically reoriented within the selected portion in response to a user input to the orientable GUI wherein the orientable GUI is reoriented by being rotated around the perimeter of the interactive display table;
    (ii) detecting a user input to the portion of the interactive display surface that is displaying the orientable GUI, the user input comprising touching a portion of the interactive display table above one of the plurality of user input controls of the orientable GUI such as to select one of the user input controls and further comprising the user's finger sliding across the interactive display table, and in response, analyzing the user input; and
    (iii) dynamically rendering the orientable GUI for display in a different orientation, based on the user input that was analyzed, the rendering comprising:
      (1) determining a speed and a direction of rotation that the user's finger slides across the interactive display table;
      (2) calculating a speed and a direction of rotation to be applied to the plurality of user input controls as they are dynamically rendered, the calculated speed being equal to the determined speed of the user's finger as it slides across the interactive display table;
      (3) applying the calculated speed and direction of rotation to the plurality of user input controls to dynamically control the speed and direction of rotation of the plurality of user input controls as the orientable GUI is dynamically rendered such that upon applying the calculated speed and direction of rotation, the plurality of user input controls commence to rotate at the calculated speed and in the calculated direction and continue to rotate at the calculated speed in the calculated direction after the user input is received and further user input indicating a user invocation to rotate the plurality of user input controls has ceased; and (3) calculating a braking parameter that is proportional to the determined speed of the user input, the braking parameter defining a rate of decay in the calculated speed of rotation of the plurality of user input controls, and applying the braking parameter to the calculated speed of rotation of the plurality of user input controls such that the rotation is stopped by the braking parameter according to the rate of decay.

14. The method of claim 1 wherein the rotation is stopped by the braking parameter.

15. The method of claim 1 further comprising receiving further user input at the dynamically orientable GUI, and in response to the further user input, stopping the rotation of the plurality of user input controls.

* * * * *